US006542264B1

(12) United States Patent
Agranat et al.

(10) Patent No.: US 6,542,264 B1
(45) Date of Patent: Apr. 1, 2003

(54) ELECTRO-HOLOGRAPHIC OPTICAL SWITCH

(75) Inventors: Aharon J. Agranat, Mevasseret Zion (IL); Benny Pessach, Tel Aviv (IL); Larry Rudolph Rogel, Brookline, MA (US)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/348,057

(22) Filed: Jul. 6, 1999

(30) Foreign Application Priority Data

Jul. 6, 1998 (IL) ................................................ 125241

(51) Int. Cl.$^7$ ................................................ G03H 1/02
(52) U.S. Cl. ................................ 359/3; 359/7; 359/15; 359/25
(58) Field of Search ............................. 359/3, 7, 9, 10, 359/25, 15

(56) References Cited

U.S. PATENT DOCUMENTS 5,335,062 A * 8/1994 Hofmeister et al. ........ 356/457
5,614,129 A   3/1997 Hofmeister
5,684,612 A  11/1997 Wilde et al.

OTHER PUBLICATIONS

J. W. Goodman, F.I. Leonberg, S.Y. Kung and R. A. Athale Optical Interconnection for VLSI Systems, published in Proceedings of the IEEE, vol. 72, pp. 850–866 (1984).
S. Somekh, E. Garmire, A. Yariv, H.L. Garvin and R.G. Hunsperger "Channel Optical Waveguides and Directional Coupling in GaAs–imbedded and Ridged", in Applied Optics, vol. 25, pp. 1530–1531 (1986).
A. W. Lohman, W. Stork and g. Stucke, "Optical Perfect Shuffle", published in Applied Optics, vol. 25, pp. 1530–1531 (1986).
R. K. Kostuk, J.W. Goodman and L. Hesselink, "Design Considerations for Holographic Optical Interconnects", published in Applied Optics, vol. 26, pp. 3947–3953 (1987).
A. Marrakchi "Photonic Switching and Interconnects", published by Marcel Dekker Inc., 1994.
H.S. Stone, "Parallel Processing with Perfect Shuffle", IEEE Transactions on Computing, vol. C–20, pp. 152–161 (1971).
A. J. Agranat, V. Leyva and A. Yariv "Voltage–controlled Photorefractive Effect in Paraelectric K Ta$_{1-x}$Nb$_2$ O$_3$:Cu,V", published in Optics Letters, vol. 14, pp. 1017–1019 (1989).
A. J. Agranat, M. Razvag and M. Balberg "Dipolar Holographic Gratings Induced by the Photorefractive Process in Potassium Lithium Tantalate Niobate at the Paraelectric Phase", published in Journal of the Optical Society of America B, vol. 14, pp. 2043–2048 (1997).
Effect of Applied Electric Fields on the Writing and the Readout of Photorefractive Gratings, De Vre et al., J. Opt. Soc. Am. B/vol. 12, No. 4, Apr. 1995, pp. 600–614.
Electric–Field Multiplexing of Volume Holograms in Paraelectric Crystals, Balberg, et al., Applied Optics, vol. 37, No. 5, Feb. 10, 1998, pp. 841–847.

* cited by examiner

Primary Examiner—Cassandra Spyrou
Assistant Examiner—Fayez Assaf
(74) Attorney, Agent, or Firm—G. E. Ehrlich Ltd.

(57) ABSTRACT

The present invention relates to an optical switch comprising a paraelectric photorefractive material, storing a hologram, possibly a latent hologram, whose reconstruction, or activation and reconstruction, is controllable by means of an applied electric field. The hologram may be formed by spatial modulation of the refractive index of the paraelectric photorefractive material, which arises from the quadratic electro-optic effect induced by the combined action of a spatially modulated space charge within the paraelectric photorefractive material and an external applied electric field.

The present invention further relates to a switching network, such as a multistage network, for use in an optical communications system, incorporating at least one optical switch according to the invention.

29 Claims, 6 Drawing Sheets

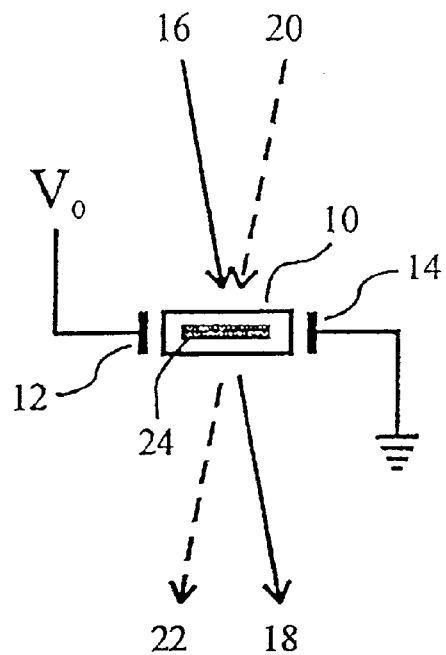
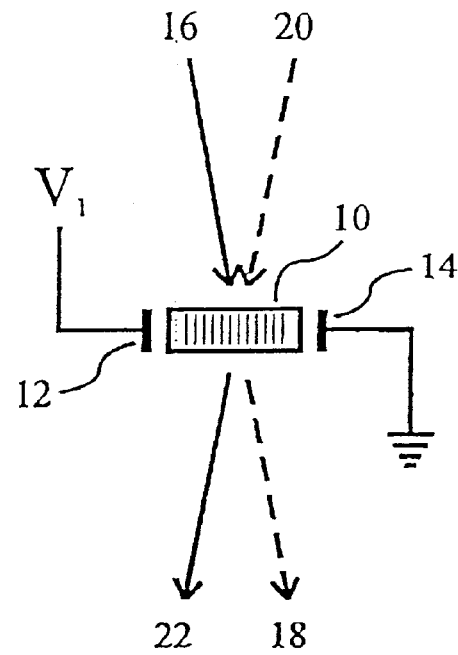
Fig. 1(a)  Fig. 1(b)
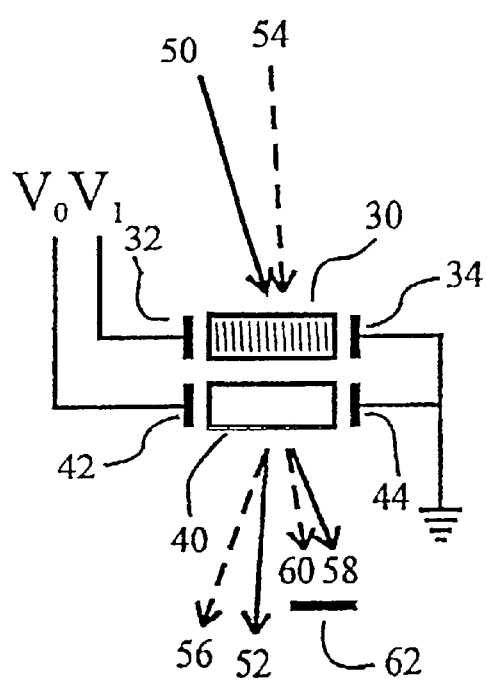
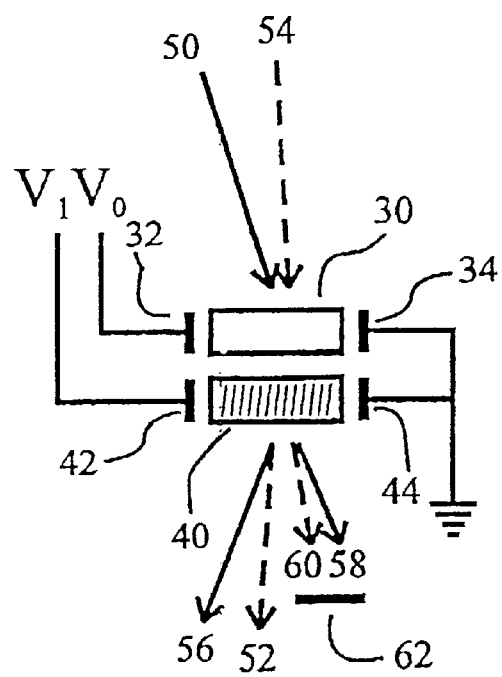
Fig. 2(a)  Fig. 2(b)

ELECTRO-HOLOGRAPHIC OPTICAL SWITCH

FIELD OF THE INVENTION

The present invention relates to the field of electronically controlled, optical switching elements, especially for use in fiber optics communication systems.

BACKGROUND OF THE INVENTION

Fast multidimensional switches are essential building blocks in high speed data communication systems, multimedia services, or high performance parallel computers. However, electronic implementations of such switches are close to their inherent limits. It is evident that it will not be possible to meet the demands of the emerging broadband communication applications by the existing electronic switching technology. Furthermore, electronic switching devices are not capable of direct integration with the optical fiber communication systems, which are becoming the dominant communications technology. Optical implementation of switching devices possess several inherent advantages over their electronic counterparts.

Free space photonic interconnects are very suitable for the implementation of parallel communication systems due to the small cross-talk between the parallel data channels, and the case whereby three dimensional guiding and routing can be achieved. The cross-talk level must be kept as low as possible in order to reduce the bit error rate (BER) of the channel. One of the basic building blocks in the construction of such networks is the high speed optical switch, such as the bypass-exchange switch. Such switches are used as the elements in Multistage Interconnection Networks (MIN). MIN's are a family of network architectures with minimal number of switches.

Many optical MIN configurations have been proposed for highly parallel communication channels with high bandwidth and low cross talk, such as those described by J. W. Goodman, F. I. Leonberg, S. Y. Kung, and R. A. Athale in their article entitled "Optical interconnection for VLSI systems", published in Proceedings of the IEEE, Vol. 72, pp. 850–866 (1984). Many of these configurations are static optical interconnects which are built either of optical waveguides, such as described by S. Somekh, E. Garmire, A. Yariv, H. L. Garvin and R. G. Hunsperger, in their paper entitled "Channel optical waveguides and directional coupling in GaAs-imbedded and ridged", in Applied Optics, Vol.13, pp.327–330 (1974), or of imaging systems such as that described by A. W. Lohman, W. Stork and G. Stucke, in "Optical perfect shuffle", published in Applied Optics, Vol. 25, pp.1530–1531 (1986), or of static holographic optical elements (HOE's) such as that described by R. K. Kostuk, J. W. Goodman and L. Hesselink, in their article "Design considerations for holographic optical interconnects", published in Applied Optics, Vol. 26, pp.3947–3953 (1987). However, dynamic optical interconnects, which enable the dynamic reconfiguration of the connecting scheme between the source nodes and the target nodes are overwhelmingly more effective, as described in the articles in the review volume entitled "Photonic Switching and Interconnects" by Abdellatif Marrakehi, published by Marcel Dekker Inc., 1994.

The structure of a MIN is usually of alternating layers of static interconnection patterns, such as the perfect shuffle described by H. S. Stone in "Parallel processing with perfect shuffle", IEEE Transactions on Computing, Vol. C-20, pp. 152–161 (1971), followed by an array of basic switching modules, known as bypass-exchange switches. The bypass-exchange switch has two inputs and two outputs with two operating states: the bypass state, in which the two input signals are directly connected to the respective output ports and the exchange state, in which the input signals are crossed between the output ports.

A common optical exchange-bypass switch currently in use utilizes a Polarizing Beam Splitter (PBS) combined with a polarization control element at the input to the PBS. The polarization control element is usually a liquid crystal, or a ferroelectric liquid crystal, which is faster. However, even the ferroelectric liquid crystal does not have a sufficiently fast response time for the requirements of present communication switching needs, and certainly not for future needs. Moreover, another major drawback of PBS is the high sensitivity of the cross-talk level of the switch to polarization instability of the transmitted light or the liquid crystal modulators. Consequently, the PBS cross-connect switch is sensitive to the temperature and environmental stability of the modulators and of the whole system.

Holographic optical elements (HOE's) and volume holograms have been used recently for two dimensional steering of light beams in optical interconnect networks, especially for highly parallel computer interconnects. However, such systems have generally relied, at least in the case of volume holograms, either on the use of a number of fixed holograms, the desired one of which is reconstructed using a reference beam selected by means of its wavelength or direction of incidence, or on the rewriting of the desired hologram in real time immediately before each steering action to be performed. Therefore, such holograms are not directly electrically switchable, and thereby do not provide for simple system construction and high speed operation.

With the increase of the bit throughput rate in optical fiber communication systems, cost effective light sources with very narrow spectral linewidths have been developed. The development of such lasers for optical communications has enabled the use of volume (thick) holograms as routing devices. Since such holograms are inherently extremely wavelength sensitive, their use had not previously been feasible commercially. The use of thick holograms now enables the packing of many routes in the same network, and thus allows three dimensional steering. However, to date, optical switches based on the use of prior art holograms, since they are not directly electrically switchable, have not shown sufficient speed, nor do they possess sufficiently low cross-talk levels, to enable their use in the optical communication systems currently under use or development.

There therefore exists a serious need for fast, dynamic, low-cross talk optical switches, to fulfill the switching requirements in current and future optical communications systems.

SUMMARY OF THE INVENTION

The present invention seeks to provide a new free-space optical switch, which overcomes the drawbacks and disadvantages of existing switches.

There is thus provided in accordance with a preferred embodiment of the present invention, a novel generic switch based on Electro holography (EH). EH enables the reconstruction process of volume holograms to be controlled by means of an externally applied electric field. EH is based on the use of the voltage controlled photorefractive effect in the paraelectric phase, where the electro-optic effect is quadratic. Volume holograms stored as a spatial distribution of space charge in a paraelectric crystal can be reconstructed by the application of an electric field to the crystal. This field activates prestored holograms which determine the routing of data-carrying light beams.

The implementation of EH based devices requires the use of a photorefractive crystal with suitable properties, such as potassium tantalate niobate (KTN), strontium boron niobate (SBN), or especially potassium lithium tantalate niobate (KLTN), as described in U.S. Pat. No. 5,614,129. KLTN doped with copper and vanadium is particularly suitable for use as the medium for EH devices.

EH devices can be advantageously used as the building blocks in Multistage Interconnection Networks (MIN). The MIN is composed of arrays of EH switches which can be electrically switched between one or more states. In each state a different set of holograms are activated, which direct the light beams in the required 3D directions to the next stage. These switches thus contain the spatial routing information, thereby obviating the need for additional optics between the stages. The EH switch thus enables a wide variety of interconnect configurations to be implemented, with compact dimensions and for large number of nodes.

Furthermore, unlike conventional holographic memory components based on conventional photorefractive crystals, which can be written and read only in the visible, the EH devices based on KLTN and similar materials can be operated in the near infra-red regions of the spectrum, including at 1.3 $\mu$m and 1.55 $\mu$m, wavelengths which are now commonly used in standard communication systems.

The use of EH switching technology can extend the routing capabilities of the basic bypass-exchange or cross-connect switch by increasing the number of input and output ports. Consequently, the use of EH switches according to the present invention enables a significant reduction in the total number of switches required for a full access MIN, thereby significantly decreasing the system size and cost.

There is thus further provided in accordance with another preferred embodiment of the present invention, an EH voltage-controlled optical switch, consisting of a paraelectric photorefractive material, wherein is stored a hologram whose reconstruction is controllable by means of an applied electric field.

In accordance with still another preferred embodiment of the present invention, there is provided an optical switch consisting of a paraelectric photorefractive material, wherein is stored a latent hologram whose activation and reconstruction is controllable by means of an applied electric field.

There is further provided in accordance with yet another preferred embodiment of the present invention, an optical switch as described above, and wherein the hologram is formed by spatial modulation of the reference index of the paraelectric photorefractive material.

There is further provided in accordance with still another preferred embodiment of the present invention, an optical switch as described above, and wherein the hologram is formed by spatial modulation of the refractive index of the paraelectric photorefractive material and is in the form of a set of at least one grating.

There is provided in accordance with still a further preferred embodiment of the present invention, an optical switch as described above, and wherein the spatial modulation of the refractive index of the paraelectric photorefractive material arises from the quadratic electro-optic effect, induced by the combined action of a spatially modulated space charge within the paraelectric photorefractive material and an external applied electric field.

Furthermore, in accordance with yet another preferred embodiment of the present invention, there is provided an optical switch as described above, and wherein the spatial modulation of the refractive index of the paraelectric photorefractive material arises from the quadratic electro-optic effect induced by the combined action of a spatial modulation of the low frequency dielectric constant within the paraelectric photorefractive material and an external applied electric field.

There is even further provided in accordance with a preferred embodiment of the present invention, an optical switch as described above and wherein the photorefractive material is a crystal of doped Potassium Lithium Tantalate Niobate.

There is also provided in accordance with a further preferred embodiment of the present invention, an optical switch as above, and wherein the electric field is applied by means of electrodes on two opposite faces of the photorefractive material.

In accordance with yet another preferred embodiment of the present invention, there is provided an optical switch consisting of at least two paraelectric photorefractive crystals, in each of which is stored at least one hologram, whose reconstruction is controllable by means of an electric field applied to each of the crystals, the crystals being disposed so that a light beam traverses them serially.

In accordance with a further preferred embodiment of the present invention, there is also provided an optical switch consisting of at least two paraelectric photorefractive crystals, in each of which is stored at least one latent hologram, whose activation and reconstruction are controllable by means of an electric field applied to each of the crystals, the crystals being disposed so that a light beam traverses them serially.

In accordance with a further preferred embodiment of the present invention, there is also provided an optical switch consisting of at least two paraelectric photorefractive crystals, as described above, and wherein each of the at least two photorefractive crystals diffracts at least one input light beam to a preselected output direction, in accordance with the at least one hologram stored therein.

In accordance with still another preferred embodiment of the present invention, there is provided an optical switch consisting of at least two paraelectric photorefractive crystals, as described above, and wherein the input light beam can be switched to a preselected output direction according to the electric field applied in each of the at least two photorefractive crystal.

There is further provided in accordance with yet another preferred embodiment of the present invention, an optical switch consisting of at least two paraelectric photorefractive crystals, as described above, and wherein undiffracted light is either absorbed by a light block or is inputted to a detector.

There is further provided in accordance with still another preferred embodiment of the present invention, an optical switch including a detector as described above, the switch being part of an optical switching network, and wherein the detector is used to read the address header of optical data traversing the switch, and wherein the address header could be used to control the switching network.

There is provided in accordance with still a further preferred embodiment of the present invention, an optical switch as previously described, and wherein the hologram is written at a visible wavelength, and the hologram is reconstructed at a near infra-red wavelength.

Furthermore, in accordance with yet another preferred embodiment of the present invention, there is provided an optical switch according to any of the above described embodiments, and wherein any arbitrary direction of each of the incoming and outgoing light beams can be defined by writing the appropriate set of holograms into each crystal.

There is even further provided in accordance with a preferred embodiment of the present invention, a switching network, which could be a multistage network, for use in an optical communications system, and incorporating at least one optical switch according to any of the above embodiments.

There is also provided in accordance with a further preferred embodiment of the present invention, a switching network for use in an optical communications system, as described in the previous embodiment, and wherein the switch layer and the static interconnection layer are integral.

The disclosures of all publications and the patent mentioned in this section and in the other sections of the specification, and the disclosures of all documents cited in the above publications and patent, are hereby incorporated by reference.

BRIEF DESCRIPTION OF THE DRAWINGS

The present invention will be understood and appreciated more fully from the following detailed description, taken in conjunction with the drawings in which:

FIGS. 1(a) and 1(b) show the implementation of a simple EH bypass-exchange switch using one crystal. FIGS. 1(a) and 1(b) respectively show the two possible states of the switch. The state of the switch is changed by changing the supplied voltage.

FIGS. 2(a) and 2(b) show another EH switching device using two crystals disposed serially and in juxtaposition. FIGS. 2(a) and 2(b) respectively show the two possible states of the switch. In this switch the state is changed by flipping the applied voltages between the two crystals.

DETAILED DESCRIPTION OF PREFERRED EMBODIMENTS

Figure 3A:
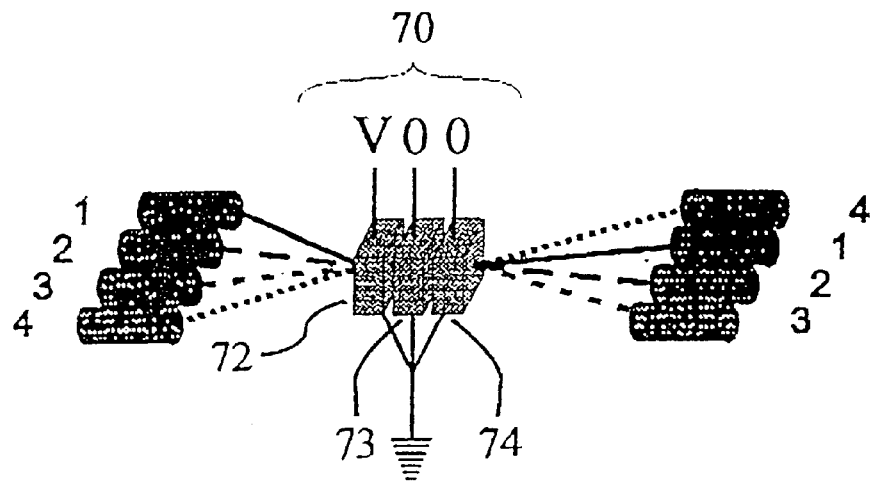
FIGS. 3(a) to 3(c) schematically show an implementation of an EH digital switch utilizing 3 crystals, which supports a full access connection between four nodes. The three figures show the three possible cyclic permutations supported by this configuration. The selection between the three permutations is done by applying a voltage to one of the crystals.

Reference is now made to FIGS. 1(a) and 1(b), which illustrate schematically the two states of a simple EH bypass-exchange switch, constructed and operative according to a preferred embodiment of the present invention. The switch consists of a photorefractive crystal 10 incorporating a single prestored grating, with electrodes 12, 14 deposited on two opposite faces. The photorefractive crystal could be of a material such as KTN, SBN, or especially KLTN. FIG. 1(a) shows the zero state of the switch, whereby an optical signal inputted along path 16 passes undeviated to output port 18, and a signal inputted to port 20, passes undeviated to port 22. When a voltage $V_1$ is applied to the switch electrodes, a spatial modulation 11 of the refractive index of the crystal is produced from the spatially modulated space charge field, set up according to the information carried by the volume hologram previously written into the crystal, and a diffraction grating is effectively established in the crystal. As a result of this, the switch state reverses, and the light signals on the input path 16 are now diffracted to path 22, and signal inputs along path 20 are diffracted into port 18.

The mechanism by which the EH switch operates is based on the use of the voltage controlled photorefractive (PR) effect, as described by A. J. Agranat, V. Leyva and A. Yariv in their paper entitled "Voltage controlled photorefractive effect in paraelectric K $Ta_{1-x}Nb_xO_3$: Cu, V, published in Optics Letters, Vol. 14, pp. 1017–1019 (1989). The PR effect enables the recording of optical information in a crystal, by spatially modulating its index of refraction in response to light energy it absorbs. The absorbed light photoionizes charge carriers from their traps to the conduction band (electrons) or the valence band (holes). The photoionized charge carriers are transported and eventually retrapped forming a space charge field spatially correlated with the exciting illumination, and inducing a modulation in the index of refraction through the electrooptic effect. This mechanism is the basis for information storage in the form of phase holograms that can be selectively retrieved by applying the reconstructing (reading) light beam at the appropriate wavelength and angle.

Recently, it has been shown that it is also possible to introduce dipolar holographic gratings into photorefractive crystals by the introduction of a spatial modulation of the low frequency dielectric constant. This effect has been described by A. J. Agranat, M. Razvag and M. Balberg in the paper "Dipolar holographic gratings induced by the photorefractive process in potassium lithium tantalate niobate at the paraelectric phase", published in Journal of the Optical Society of America B, Vol. 14, pp. 2043–2048 (1997).

In the paraelectric phase, the efficiency of these effects can be controlled by applying an external electric field on the crystals during the reading (reconstructing) stage.

In general, the diffraction efficiency is proportional to the local photoinduced changes in the index of refraction ($\delta(\Delta n)$). In the paraelectric phase, the electrooptically induced modulation of the index of refraction depends quadratically on the polarization and is given by:

$$\Delta n(r) = (\tfrac{1}{2}) n_0^3 g [P(r)]^2 \qquad (1)$$

where $\Delta n(r)$ is the induced change in the index of refraction, $n_0$ is the refractive index, g is the quadratic electrooptic coefficient; and P is the low frequency polarization. When a space charge field $E_{sc}(r)$ is formed in the crystal, the modulation which it induces in the index of refraction, and which contributes constructively to the diffraction is given by:

$$\delta(\Delta n(r)) = n_0^3 g \, \epsilon^2 \, E_0 E_{sc}(r) \qquad (2)$$

assuming that the polarization is in the linear region $P = \epsilon E$, where $\epsilon$ is the dielectric constant, and $\epsilon = \epsilon_0 \epsilon_r$, and close to the phase transition $\epsilon_r \gg 1$, and $E_0$ is the externally applied field.

It can thus be seen that the information-carrying space charge field is transformed into a modulation of the refractive index only in the presence of an external electric field. Therefore, the use of the quadratic electrooptic effect enables analog control of the efficiency of the reconstruction of the information. This is known as the voltage controlled PR effect.

In terms of the applied field, the diffraction efficiency of plane phase transmission holograms stored in the paraelectric phase is given by:

$$\eta = \sin^2\left(\frac{\pi d}{\lambda \cos\theta} n_0^3 g \delta^2 E_0 E_{sc}\right) \quad (3)$$

where d is the thickness of the crystal, $\lambda$ is the optical wavelength, $\theta$ is the angle between the reading beams and the equiphase planes of the grating, $n_0$ is the refractive index, g is the effective quadratic electrooptic coefficient, s is the dielectric constant, $E_0$ is the externally applied low frequency field, and $E_{sc}$ is the amplitude of the space charge field formed when a hologram is written in the PR crystal.

It is assumed in eq. (3) that:

(i) the Bragg condition is satisfied, namely that $$2 \Lambda n \sin \theta = \lambda_{mat} \quad (4)$$

where $\Lambda$ is the periodic grating spacing, $n(=n_0)$ is the refractive index, $\theta$ is the angle between the reading beams and the equiphase planes of the grating, and $\lambda_{mat}$ is the wavelength in the material;

(ii) the polarization is in the linear region (i.e. P–$\epsilon$E), with $\epsilon/\epsilon_0 >> 1$; and (iii) the absorption can be neglected.

It can be seen from eq. (3) that once a space charge field is written in the crystal, its resulting diffraction efficiency can be controlled by the applied external field $E_0$ during the readout of the hologram.

Though it would be expected that at zero external applied field, the diffraction efficiency would fall to zero, and only a latent hologram would be present in the crystal, in effect, the presence of stray non-zero internal fields ensures that there is always a slightly positive residual diffraction effect, even in zero applied field.

KLTN is a new PR crystal designed to be operated in the paraelectric phase, where the PR effect is voltage controlled. The composition and method of production of this crystal have been fully described in U.S. Pat. No. 5,614,129, hereby incorporated by reference. The chemical composition of the KLTN crystal used in this preferred embodiment of the present invention is $K_{0.9945}Li_{0.0055}Ta_{0.65}Nb_{0.33}O_3$. This composition was determined by electron microprobe analysis and atomic absorption measurements. The phase transition temperature of the KLTN crystal used, as determined by measurement of the temperature dependence of the dielectric constant, is $T_c = 26°$ C. In order to improve the performance of the crystal, prior to writing the holograms, the crystals are subjected to a poling process in which they are gradually cooled at 0.5° C./minute from 40° C. to 10° C. under an external field of 2.1 kV/cm, and then warmed-up to the operational temperature at the same rate. During operation, the crystal is held at 32° C., which is 6° C. above its phase transition temperature, well within the paraelectric phase. The temperature is maintained by means of a stabilized thermoelectric element 24 in juxtaposition to the crystal, as shown in FIG. 1(a). For reasons of clarity, the element has been omitted in the rest of the figures.

The embodiment of the simple EH switch shown in FIGS. 1(a) and 1(b) can be used in many MIN architectures in place of the previously used ferroelectric or liquid crystal Polarizing Beam Splitter (PBS) switches. The EH switch is controlled by applying voltage directly to the crystal, instead of rotating the light polarization at the entrance of each switch, as for the PBS switch. A major advantage of the EH switch is that its switching time is much faster than the slow response time of the previously available liquid crystal devices, even of the ferroelectric type. The measured switching time of a KLTN EH switch according to the present invention is of the order of 100 nsec, but it would appear that this is a limit of the measurement equipment, and that actual switching speeds are even faster. Such switching times are very short compared to the other switching technologies currently used for free space optical switching, such as the above-mentioned LCD devices. The very short switching time is a cardinal advantage of the KLTN EH switch, which makes this technology so advantageous for use in switching networks. These switching times are clearly suitable for circuit switching applications and even close to the speed required to support packet switching.

However, like the PBS switch, the simple EH bypass-exchange switch suffers from the same problem of high sensitivity of the cross-talk level to polarization error of the incoming light. In the EH switch, the cross-talk arises from the polarization dependence of the diffraction efficiency, due to the difference of the quadratic electro-optic coefficients for the two polarizations. Another drawback of the simple EH switch configuration is the need to achieve as close as possible to 100% efficiency of the thick hologram to eliminate the cross-talk. Thus, for example, if only 99.9% diffraction efficiency is achieved, the 0.1% of the signal which is transmitted undiffracted leads to a cross talk figure of 30 dB. Since the diffraction efficiency is a function of applied parameters, such as the electric field, and of the crystal properties, which are themselves dependent on environmental conditions, the exact 100% efficiency peak is difficult to achieve, and the cross-talk level is thus sensitive to environmental and applied conditions. It should be noted that in both configurations, the polarization sensitivity of the cross-talk can be solved by use of a closed loop control system, but this complicates the system, and makes it considerably more expensive.

FIGS. 2(a) and 2(b) are schematic illustrations of a further embodiment of an EH switching device constructed and operative according to the present invention, which overcomes the above-mentioned cross-talk problem of the simple EH switch described in the first embodiment. FIG. 2(a) shows the switch in one state, while FIG. 2(b) shows the other state. In this switching device, two KLTN crystals 30, 40 are disposed serially and in juxtaposition. Each of the crystals has its own set of separate electrodes, 32, 34 for crystal 30, and 42, 44 for crystal 40, such that an electric field can be applied to each of the crystals independently. Each crystal contains a different set of holograms which makes a predetermined set of diffraction connections when turned on. By applying voltage to the first crystal, the connection set written in that crystal is selected, and by applying voltage to the second crystal, the connection set written in that crystal is selected. As a result, each of the crystals performs a single permutation of all of the incoming beams. This permutation is defined by the set of holograms written in that crystal, and since the holograms are thick, the Bragg condition prevents the required hologram for each route from affecting the other routes.

Therefore, since any arbitrary direction of the light beams can be programmed into each crystal, this switch configuration is able to combine the switch layer with the static interconnection layer into one integral layer in the construction of the MIN. This feature saves the need for additional optics between the stages of the MIN, as had been necessary in prior art MIN structures, and allows the introduction of a wide variety of multistage architectures, with compact dimensions even for large numbers of nodes. This enables the construction of a whole new class of MIN architectures, with compactness, flexibility and cost-effectiveness, hitherto unattainable with the prior art switches.

As previously mentioned, an element for maintaining the crystals at a stable temperature slightly above the phase transition point is required, as in FIG. 1(a), but this has been omitted in the drawings to increase clarity.

In operation, when the switch is in the first state, as shown schematically in FIG. 2(a), voltage $V_1$ is applied to crystal 30 and voltage $V_0$ to crystal 40, with the result that an input signal on port 50 will be diffracted into port 52, and an input signal on port 54 will be diffracted into port 56. The switch is switched to the other state, as shown in FIG. 2(b), by flipping the applied voltages between the two crystals. Voltage $V_0$ is applied to crystal 30 and voltage $V_1$ to crystal 40, with the result that an input signal on port 50 will now be diffracted into port 56, and a signal on port 54 will be switched to port 52. It is thus evident that this device has the function of a bypass-exchange switch, like that in FIGS. 1.

However, in the embodiment shown in FIGS. 2(a) and 2(b), no use is made at all of the non-diffracted beams in the switching function, since the signals from both inputs undergo diffraction in the first or second crystal. The non diffracted beams are simply absorbed in a light block 62 and rejected. Therefore, changes of polarization, or in the environmental conditions, or changes in the applied switching voltages do not result in increased cross-talk, but only in small changes of the system transmission, because of small changes in the signal lost to the light block 62. Furthermore, since the switch state is determined solely by which crystal the voltage is applied to, and there is no need to achieve close to 100% diffraction efficiency, there is therefore much less sensitivity to the applied voltage level. These properties make this embodiment of the switch much more robust, both environmentally and in operating conditions. This embodiment could be described as a digital mode of EH switch operation, while the simple EH switch shown in FIGS. 1(a) and 1(b) could be seen as operating in an analog mode. As with all such systems, digital operation has much more tolerance to operating conditions, and much more resistance to interference. Finally, the Digital EH Switch (DEHS) can be constructed with a multiplicity of states, using many crystals serially, each with its own set of connection conditions, as discussed hereunder, thus significantly reducing the total number of required switches in the MIN.

Figure 3B:
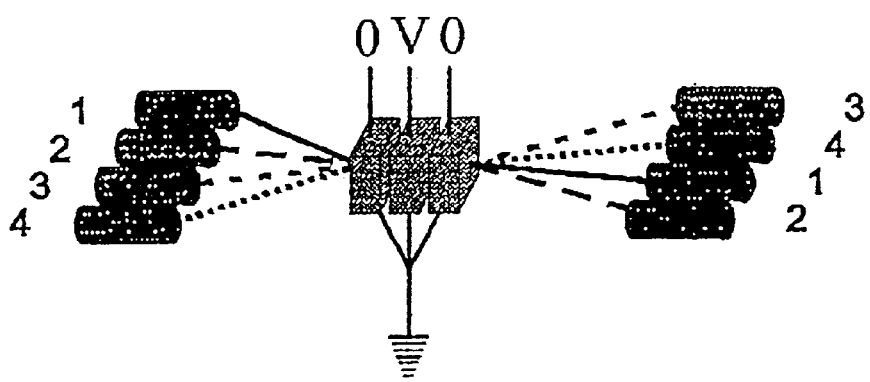
Figure 3C:
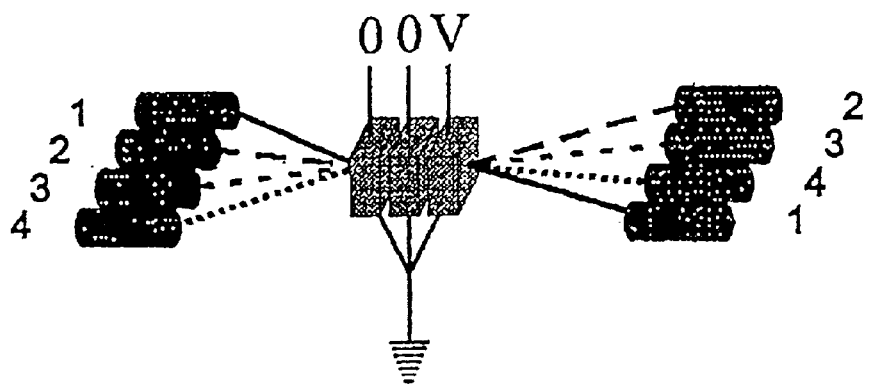

By adding more crystals serially to the two crystals shown in FIGS. 2(a) and 2(b), and by writing more holograms on each crystal, the number of routes handled by a single switch module can be significantly increased. Reference is now made to FIGS. 3(a) to 3(c), which schematically show a digital EH switch 70, constructed and operative according to a further embodiment of the present invention. This switch module connects four nodes, labeled 1 to 4, by the use of three crystals 72, 73, 74. Each crystal in FIG. 3(a) contains four different gratings, angularly multiplexed on the same crystal. This configuration contains the minimal number of crystals for supporting a full access connection between 4 nodes. This means that each node can be connected to each of the other nodes, but not all the permutations are possible. The supported permutations in this embodiment are chosen to be the three cyclic permutations shown in FIGS. 3(a) to 3(c). Each crystal contains one of the required permutations, which is realized by four previously recorded holograms on that crystal. Each of the four holograms is recorded such that it directs the light coming from one of the sources to the respective detector, according to the required permutation.

In the operation of the switch, the required permutation is selected by applying a voltage to the corresponding crystal. When the voltage is applied to the crystal all four holograms stored in that crystal are turned on and all the four light beams are routed in parallel, to their predesignated destination. For example, in FIG. 3(a), the four holograms activated in crystal 72 send data in parallel and exclusively from node 1 to node 2, from node 2 to node 3, from node 3 to node 4, and from node 4 to node 1. FIGS. 3(b) and 3(c) show the cyclic parallel routing schemes chosen for this switch module. The number of possible permutations can be increased beyond the minimal by adding more crystals to the switch.

The wavelengths currently used for high speed optical communications are in the near infra-red, especially 1.3 $\mu$m and 1.55 $\mu$m. Therefore, the thick holograms should be reconstructed in those wavelengths, where the switches are to be used, although the holograms have to be recorded at $\lambda_w$-532 nm, where the materials have sufficient sensitivity to make efficient recording possible. Furthermore, the use of infra-red reconstruction beams does not affect the existing space charge distribution, because of the negligible photo-excitation sensitivity at these wavelengths. This property saves the need for a fixing process, which is not yet been technologically developed for photorefractive crystals.

This change in wavelength determines the angles of the writing beams such that the recorded grating Bragg conditions fit the required reconstruction angles. If a grating is required to route a collimated light beam of wavelength $\lambda_r$ coming from an angle $\theta_{r1}$ to an angle of $\theta_{r2}$ (all the angles are relative to the perpendicular to the crystal face) then the angles of the two writing beams of wavelength $\lambda_w$ are given by:

$$\theta_{w1,2} = \frac{\theta_{r1} + \theta_{r2}}{2} \pm \sin^{-1}\left(\frac{\lambda_w}{\lambda_v}\sin\left(\frac{\theta_{r1} - \theta_{r2}}{2}\right)\right) \quad (5)$$

This relation is derived from the Bragg condition for thick holograms, as defined in equation (4). Equation (5) is correct for the case of symmetric or small angle transmission holograms. In the general case, the change of the beam directions in the entrance to the crystal due to Snell's law should be considered. The angles of the two writing beams of wavelength $\lambda_w$ in the general case are given by:

$$\theta_{w1,2} = \sin^{-1}\left(n_0 \cdot \sin\left(\frac{\sin^{-1}\left(\frac{\sin\theta_{r1}}{n_0}\right) + \sin^{-1}\left(\frac{\sin\theta_{r1}}{n_0}\right)}{2} \pm \right.\right.$$

$$\left.\left. \sin^{-1}\left(\frac{\lambda_w}{\lambda_v}\sin\left(\frac{\sin^{-1}\left(\frac{\sin\theta_{r1}}{n_0}\right) - \sin^{-1}\left(\frac{\sin\theta_{r1}}{n_0}\right)}{2}\right)\right)\right)\right) \quad (6)$$

When few permutation are implemented, the holograms on the different crystals share the reconstruction entrance or exit angles. But, because of the different wavelength used in the writing stage, the writing angles would be unique for each crystal. Consequently, the writing system must have the ability to expose the crystals with two coherent beams at continuously and accurately adjustable angles.

Figure 4:
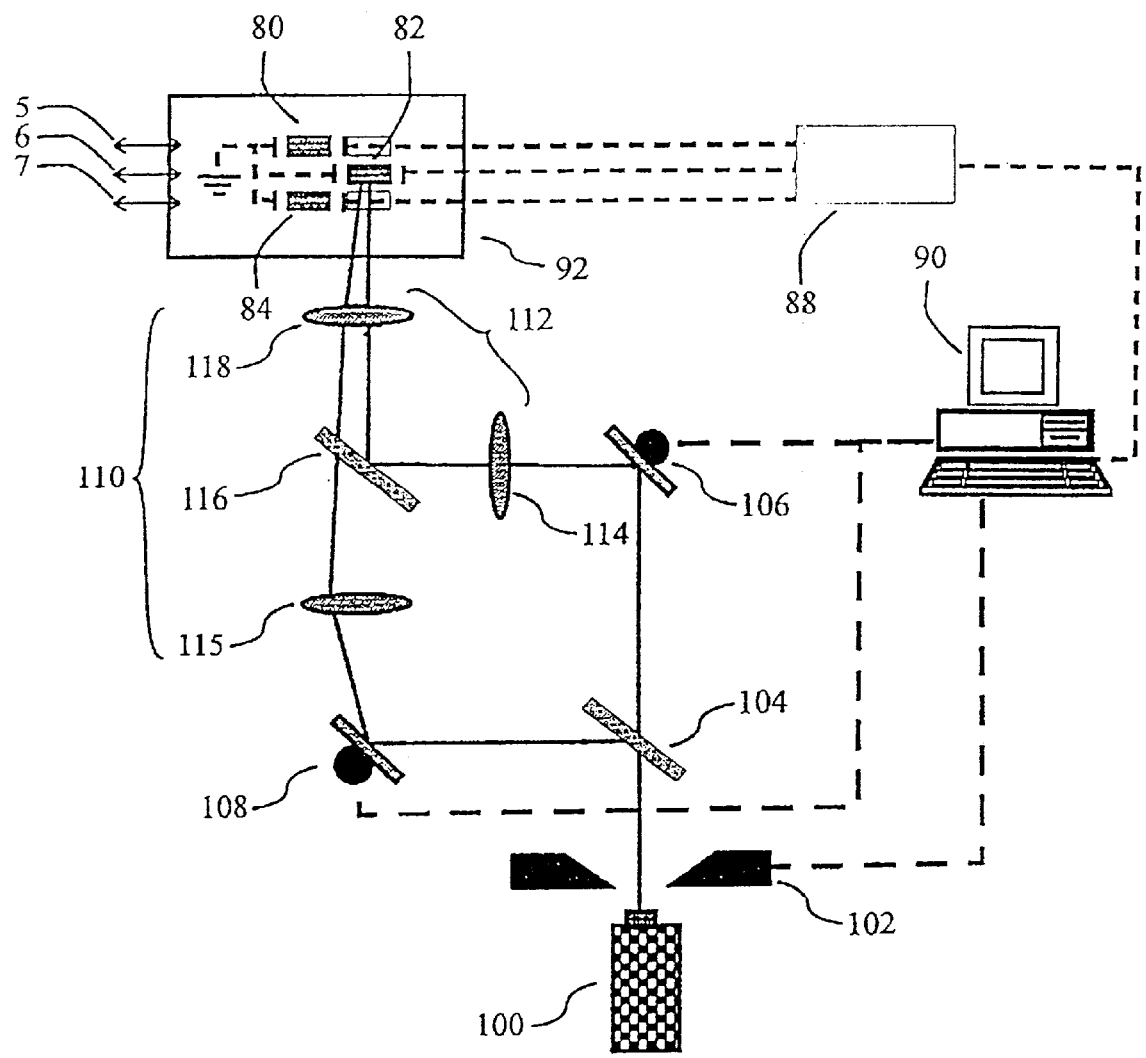
FIG. 4 is a schematic representation of the optical system used for writing the holograms on the three crystals of a 4-node digital EH bypass-exchange switch. This system is used in the production stage of the switch, and the figure shows a number of computer controlled elements of the writing system, in order to make the process speedy and automatic, for high volume production.

FIG. 4 shows a schematic representation of the optical system used for writing the holograms on the crystals, according to the conditions given in equations (5) and (6) hereinabove. This system need be used only in the production stage of the switch. After the optimization of the holograms in the switch, they remain for an extremely long time, without any appreciable erasure evident.

The switch is made of three KLTN crystals 80, 82, 84, according to the previously described configuration. The three crystals are mounted separately on three miniature computer controlled linear stages 85, 86, 87, schematically shown by the arrows indicating the crystal motion. These stages are used for sliding each crystal into and out of the writing beams, to allow each crystal to have its own specific holograms written in separately. The three linear stages are mounted on a thermo-electric heater/cooler 92, to stabilize the temperature. The crystals used in the switch module according to this embodiment of the present invention are 3 mm×3 mm×3 mm in size, and are cut along the [100] crystallographic directions. Two gold electrodes are sputtered on the horizontal facets perpendicular to the optical axis, for applying the voltage. The crystals are gripped with miniature clamps, allowing for easy and rapid exchange of the crystals. The clamps have electric contacts to the gold electrodes, but are isolated from the linear stage by a small ceramic plate, so that high voltages can be applied to the crystal without shorting. The ceramic plate also provides good thermal contact to facilitate thermal stabilization of the crystals. The high voltage power supply 88 is controlled by means of commands sent from the central computer 90. This computer also controls the motion stages.

The KLTN crystals are coated with an anti-reflective coating, because of their high index of refraction (n=2.1). A half wavelength layer anti-reflective coating of either $MgF_2$ or $SiO_2$ is typically used. Both coatings reduce the reflection from about 12% to 0.2% at a wavelength of $\lambda_r$=1.3 $\mu$m and an angle of $10''$ from the perpendicular to the coated face.

When writing, the light from a frequency-doubled, diode-pumped Nd:YaG laser 100 ($\lambda$=532 nm) is passed through a computer controlled shutter 102 and then split by means of beam splitter 104 into two vertically polarized plane wave beams, each of about 20 mW. These two beams are used to write the planar phase transmission holograms on each crystal. Each of the beams is reflected from mirrors mounted on computer controlled rotation stages 106, 108, having 0.005° angular accuracy, into its own 4f imaging system 110, 112, each of which images its own mirror onto the crystal. Thus, rotation of the mirror changes the angle of incidence of the beam on the crystal accordingly. The 4f imaging systems are needed for keeping the beam collimated. Each 4f system is constructed of two symmetric doublets 114, 118 and 115, 118 of 3" focal length each. The two beams are combined in the middle of the 4f imaging system using a 50/50 flat beam splitter 116, disposed such that the second lens 118 of the 4f imaging systems is common to both 4f systems, and is shared by the two beams. This configurations allows the angles of the two writing beams to be set to any angle in the range ±10° by rotation of the two mirrors mounted on the rotation stages. In order to achieve the high angular accuracy requirement for the thick holograms, the lens distortion aberrations are eliminated by means of a calibration process. Since all motion components of the system are computer controlled, an angular look-up table can be built using the calibration results to compensate for the angular distortions. Furthermore, computer control of all of the elements of the writing process makes it speedy and automatic, for use in high volume switch production.

Each crystal is written separately by sliding the two other crystals out of the beam path, so that light does not erase the holograms written on them. In the situation depicted in FIG. 4, the center crystal 84 is being written, while the other two crystals 80, 84 have been slid out of the beam line. The four angular multiplexed holograms on each crystal are written sequentially. The rotation angles of the mirrors, and the exposure periods for each of the successive holograms are computer controlled using a recursive schedule formula designed to maintain constant efficiency for the entire ensemble of written holograms. For the crystal size used, the holograms are written under a constant applied field of 2.1 kV/cm.

Figure 5:
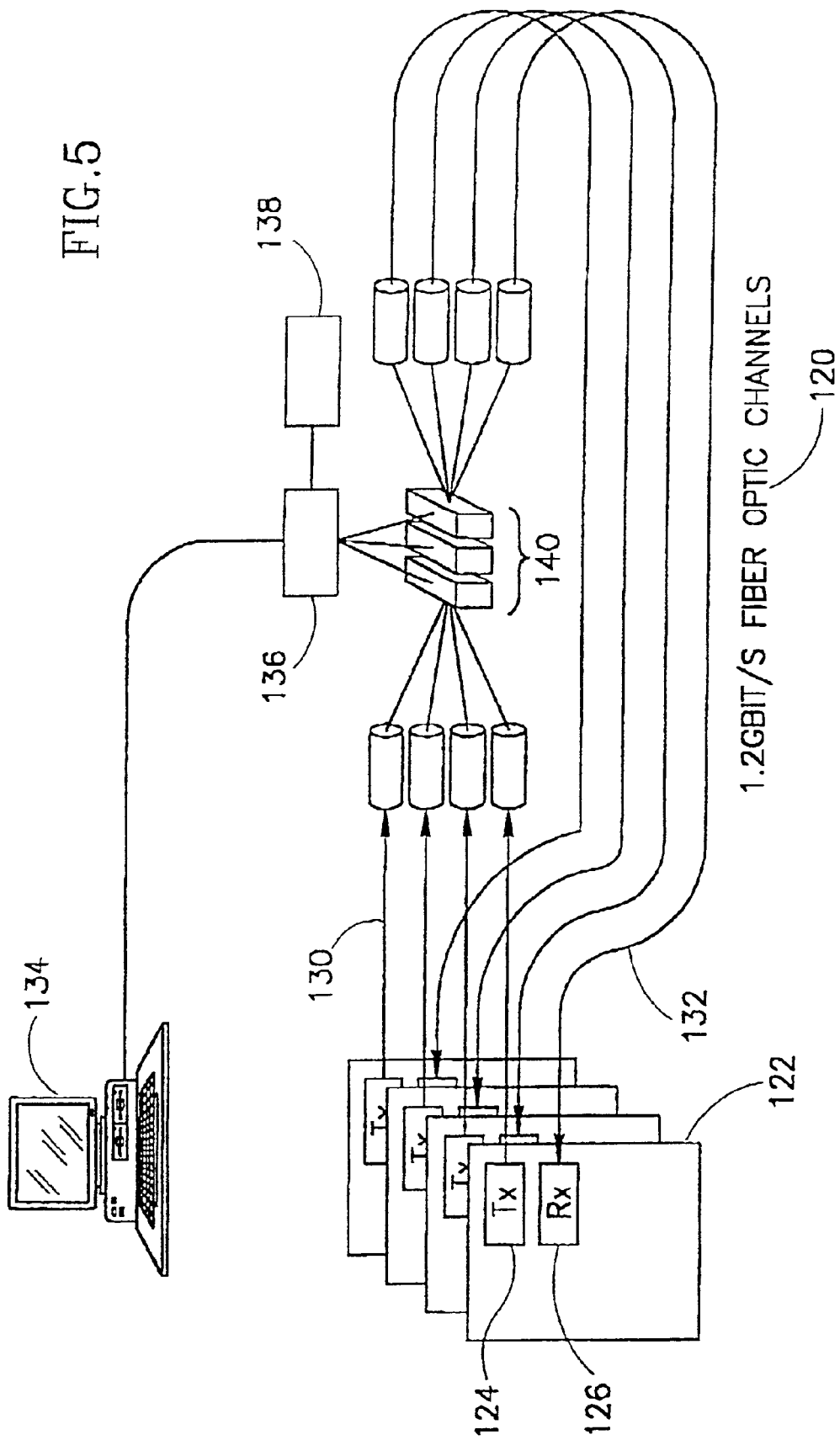
FIG. 5 schematically shows the architecture of a switching network constructed with 4-node digital EH crossconnect switches. The network is shown connecting 4 PC computers by means of 1.2 Gbit/s optical fiber communication links.

Reference is now made to FIG. 5, which schematically shows the architecture of a network, constructed and operative with digital EH bypass-exchange switches, according to a further embodiment of the present invention. In this embodiment, the network is used to connect 4 PC computers with 1.2 Gbit/s optical fiber communication links 120. Each computer has a PCI bus communication (logic analyzer) board 122 for interfacing between the computer and an optical transceiver. The optical transceiver is implemented using a BCP 15T module as the transmitter 124 and a BCP 15R as the receiver 126. These modules are manufactured by B.C.P. Inc. of Melbourne, Fla., U.S.A. The BCP 15T module multiplexes 16×60 mBit/s channels into a single 1.2 Gbit/s channel, which modulates a fiber optic pigtailed DFB laser operating at $\lambda_r$=1.55 $\mu$m. This laser is mounted on-board and is not shown in FIG. 5. The BCP 15R module consists of a fiber optic pigtailed receiver for 1.2 Gbit/s, and a demultiplexer with 16×60 Mbit/s output channels. Each computer is thus connected with 2 fibers to the cross-connect switch system 128, a single-mode fiber 130 which transmits the light into the switch, and a 50/125 multimode fiber 132 which receives the light from the switch. Collimating lenses are required to couple between the switch ports and the fibers, but are not shown in the drawing for clarity. The transmitter fiber should preferably be a polarization maintaining fiber, in order to maintain the optimal holographic efficiency.

The switch is controlled using a fifth computer 134 with a D/A board. The analog output of this board controls a switching module 136 containing three high voltage, high speed semiconductor switches, for switching the required ±700 V from a power supply 138 to each of the three crystals in the switch 140.

An important advantage of the digital EH switch configuration is the ability of a single switch to route k channels instead of the case of only k=2 channels for the simple analog EH switch. This feature is utilized when the switch is placed into the MIN. The minimal number of layers in a full access MIN is given by:

$$L = \log_k N \qquad (7)$$

where N is the number of nodes. The minimal overall number of required switches in a full access MIN is given by:

$$S = \frac{N}{k} L = \frac{N}{k} \log_k N \qquad (8)$$

Therefore, it can be seen that the number of layers and the overall number of required switches decrease dramatically with k. Furthermore, k can be used to adjust the number of possible permutations which the network can perform, or the number of degrees of freedom, according to the demand and the required cost.

A digital EH switch which is capable of handling k routes, can be made of m adjacent crystals, where each crystal contains k holograms. Each of the m crystals performs one of the m required permutations of the k routes. The condition on the required number of crystals m in a single k routes switch which is a part of a minimal number of switches MIN described by equations (7) and (8) is m≧k. If m<k, the MIN would not be full access. If m=k, a full access MIN can be achieved with a minimal number of switches, where using Eq. (8) the required total number of crystals for the whole network would be:

$$n_{crystals} = N \log_k N \quad (9)$$

This number is a figure of merit for the system complexity and cost.

Additional degrees of freedom or possible permutations can be added by increasing m such that m>k. Equation (9) shows that the system cost decreases very rapidly as k is increased. Therefore a maximal k is desired to achieve the minimal cost. The maximal k is limited by the efficiency of each of the k holograms written in the crystals, since the efficiency of each individual hologram decreases as the square of the number k of stored holograms. A compromise value of k must therefore be chosen, in accordance with accepted criteria for system cost versus performance.

Figure 6:
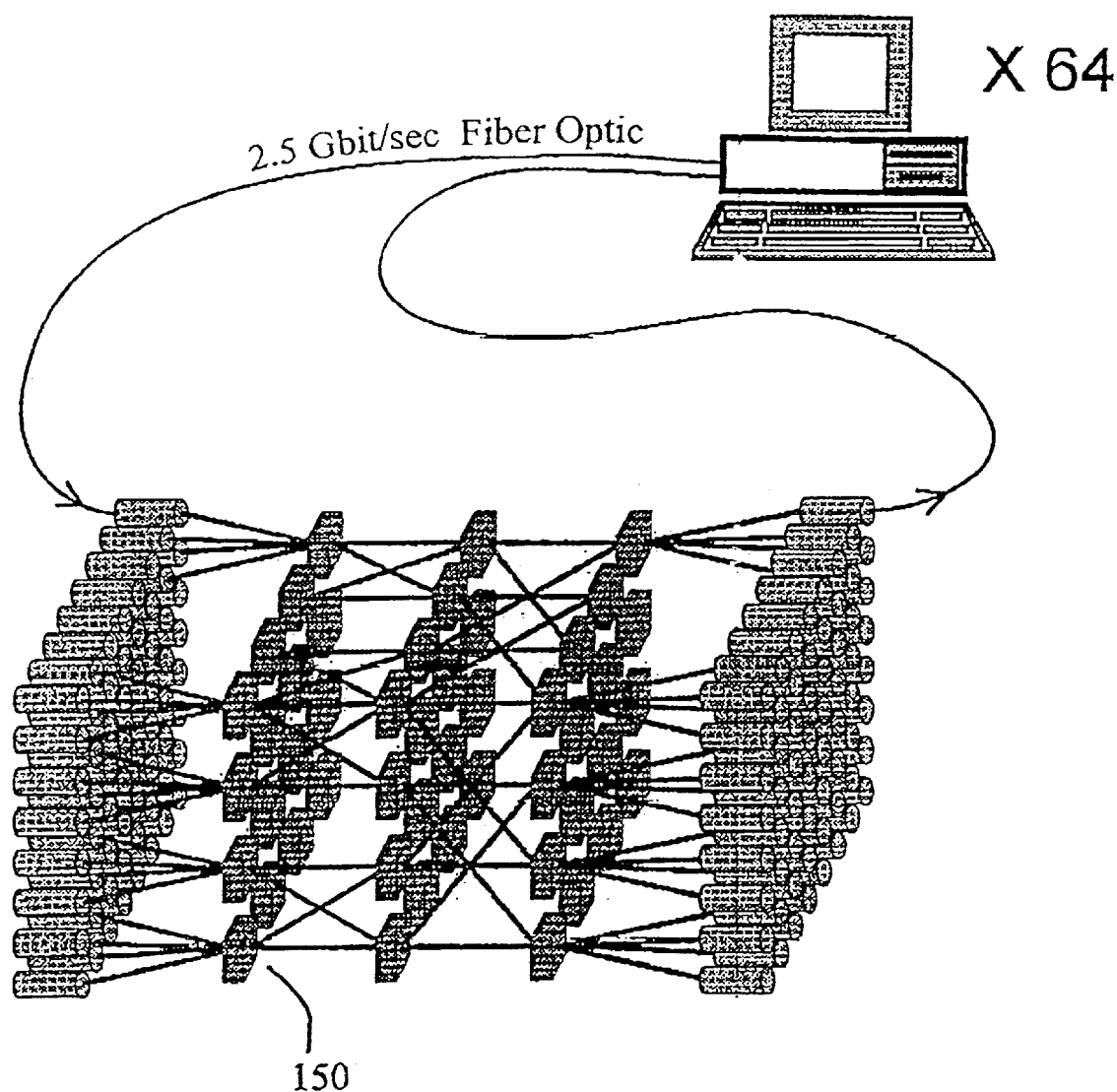
FIG. 6 is a schematic illustration of a large scale MIN, constructed from an array of 4-node EH digital switches, providing full access switched connection between 64 nodes. The network is shown interconnecting 64 fiber optic data channels operating at 2.5 Gbit/sec.

FIG. 6 is a schematic illustration of a large scale MIN, constructed and operative according to a further embodiment of the present invention, built from an array of 4-node EH digital switches 150, for providing full access switched connection between 64 nodes. The particular architecture used for connecting the individual switch modules in this MIN is the Banyan network. The network shown interconnects 64 fiber optic data channels operating at 2.5 Gbit/sec, which is typically used currently for very high speed optical communication systems.

The control and management of switching networks is usually divided into two main approaches—central or distributed. The MIN basically belongs to the central control group which is inherently more complex and limited. However, by combining a few EH MIN modules together to form a larger cross-connect network, an element of distribution of the route control can be achieved.

A major issue in the architecture of the cross-connection switch, which is dependent on the network management approach adopted, is the access time. One of the factors which contributes to the access time, besides the inherent switching time of the EH switch, is the method and the protocol used by the nodes to send the required address. The preferred method is to send a header with each batch of data on the optical channel, which includes the address, similar to the system used, for example, in ATM. This method requires the delivery of a sample of the light as the input of the system to an optical detector. In the above suggested preferred embodiment of the architecture of the digital EH switch, the non-diffracted light is blocked and rejected, in order to eliminate cross-talk. If this block is replaced, however, by an optical detector, communication information such as the header can be read and used to control the switch state accordingly.

Figure 7:
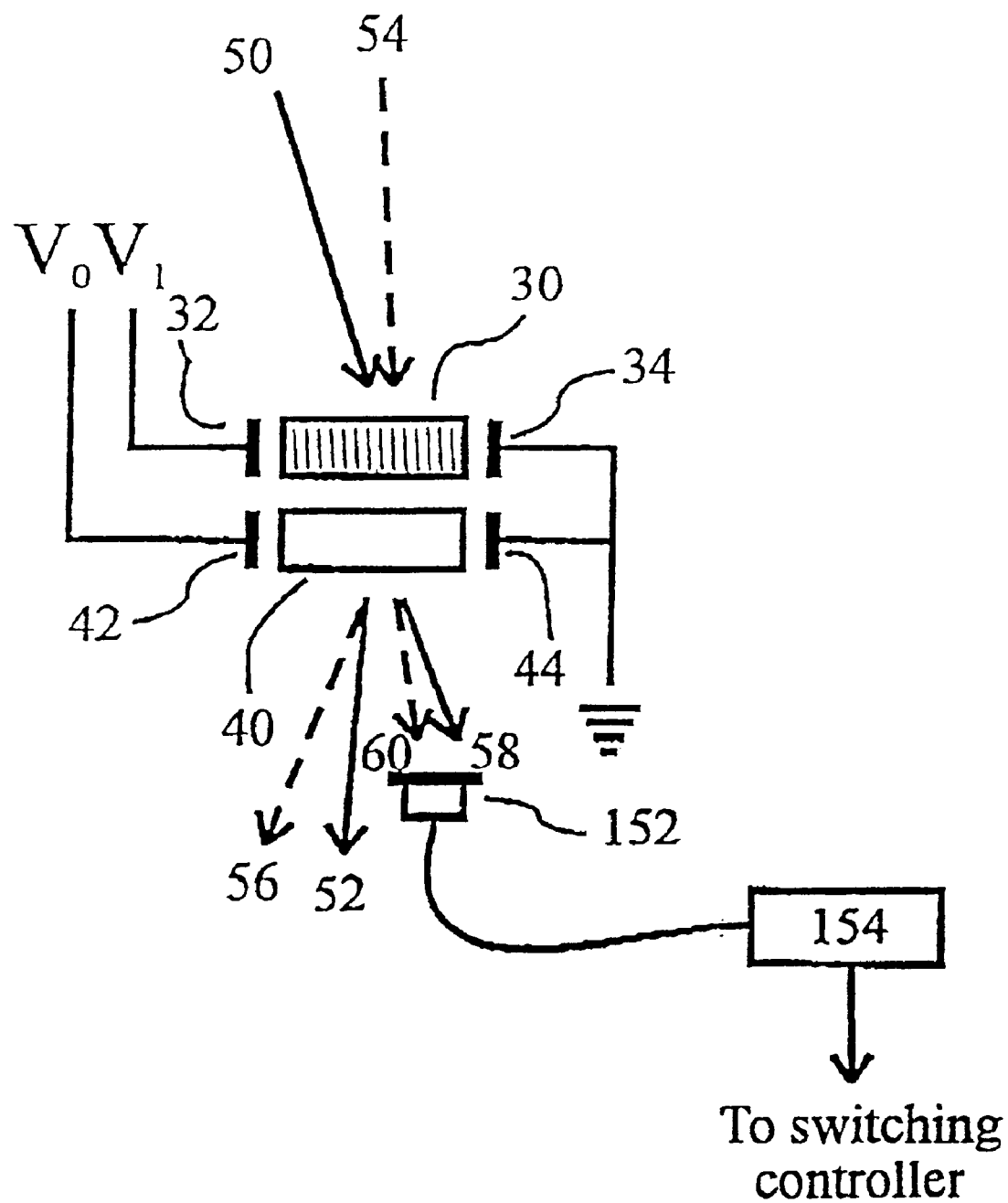
FIG. 7 shows a digital EH switch including a detector for reading the address header of optical data batches traversing the switch, to ensure that the data is switched to its intended destination.

FIG. 7 shows a digital EH switch according to another preferred embodiment of the present invention, including a detector 152 for reading the address header of optical data batches traversing the switch. The header address information is conveyed to a processing unit 154 for providing the correct control signals for the switching network, to ensure that the data is switched to its intended destination. The other components are as in FIGS. 2(a) and 2(b).

The combination of the digital EH switch with WDM technology can enlarge the possible architectures very significantly, and improve the resulting performance. Due to the high selectivity of thick holograms, additional holograms can be added, for the additional wavelengths, on the same switches. Those holograms can direct the different wavelengths to arbitrary directions. Thus, each wavelength in the WDM channel can be routed dynamically through a different path in the MIN and be sent to any other node. An attractive option is to use the wavelength change of adjustable wavelength laser diodes, which can be changed within 1 nsec, to make a very fast cross-connect switch out of a limited set of connections which themselves can only be changed more slowly (i.e. 100 nsec) using the EH effect.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An on/off electroholographic switch comprising:
   a photorefractive material being in a paraelectric phase, in which material a plurality of latent holograms, whose activation is controlled by the application of a single, external electric field, is stored, wherein when activated, said plurality of holograms diffract a same plurality of incoming beams, in accordance with a predetermined set of connections;
   a temperature-control device, for maintaining said material at a predetermined, stable temperature of the paraelectric phase; and
   a power supply, in electrical communication with said material.

2. The on/off electroholographic switch of claim 1, wherein said same plurality of incoming beams comprises a same plurality of beams of different angles of incidence.

3. The on/off electroholographic switch of claim 1, wherein said same plurality of incoming beams comprises a same plurality of beams of different wavelengths.

4. The on/off electroholographic switch of claim 1, wherein said on/off electroholographic switch has a switching time of less than 100 nsec.

5. The on/off electroholographic switch of claim 1, wherein each of said plurality of latent holograms, stored in said material, is activated to become an active hologram in the form of spatial modulation of the refractive index in said photorefractive material, and further wherein said spatial modulation arises from a quadratic electro-optic effect induced by the combined action of:
   a locally distributed electric field induced by a spatially modulated space charge forming the latent hologram within said paraelectric photorefractive material; and
   an external applied electric field.

6. The on/off electroholographic switch of claim 1, wherein each of said plurality of latent holograms, stored in said material, is activated to become an active hologram in the form of spatial modulation of the refractive index in said photorefractive material, and further wherein said spatial modulation arises from a quadratic electro-optic effect induced by the combined action of:
   a spatially modulated low frequency dielectric constant forming the latent hologram within said paraelectric photorefractive material; and
   an external applied electric field.

7. The on/off electroholographic switch of claim 1, wherein said photorefractive material is selected from the group consisting of SBN, KTN and KLTN.

8. The on/off electroholographic switch of claim 1, wherein said photorefractive material comprises KLTN.

9. The on/off electroholographic switch of claim 1, wherein said electric field is applied by means of electrodes, plated on two opposite faces of said photorefractive material.

10. A digital electroholographic switch comprising:
- a first photorefractive material being in a paraelectric phase, in which material, a first set of k latent holograms is stored, k being an integer selected from the group consisting of 2 and integers greater than 2, wherein the activation of said first set of k latent holograms is controlled by the application of a single, external electric field, and wherein said first set of k latent holograms diffracts k incoming beams, in accordance with a first predetermined set of k connections;
- a second photorefractive material being in a paraelectric phase, in which material, a second set of k latent holograms is stored, wherein the activation of said second set of k latent holograms is controlled by the application of said single, external electric field, and wherein said second set of k latent holograms is operable to diffract said k incoming beams, in accordance with a second predetermined set of k connections;
- a temperature-control device, for maintaining said first and second photorefractive materials at a predetermined, stable temperature of the paraelectric phase; and
- a power supply, adapted for selectable electrical communication with either one of said first and second photorefractive materials;

wherein said first and second photorefractive materials are disposed so that a light beam traverses them serially, and wherein said single, external electric field may be selectably applied to only one of said first and second photorefractive materials, at any one time, forming said digital electroholographic switch.

11. The digital electroholographic switch of claim 10, and further including at least one additional photorefractive material being in a paraelectric phase, in which material, at least one additional set of k latent holograms is stored, wherein the activation of said at least one additional set of k latent holograms is controlled by the application of said single, external electric field, and wherein said at least one additional set of k latent holograms is operable to diffract said k incoming beams, in accordance with at least one additional predetermined set of k connections, wherein said photorefractive materials are disposed so that a light beam traverses them serially, and wherein said single, external electric field may be selectably applied to only one of said photorefractive materials, at any one time, forming said digital electroholographic switch.

12. The digital electroholographic switch of claim 10, wherein the number of photorefractive materials is m, and wherein m is an integer selected from the group consisting of m=k and m>k.

13. The digital electroholographic switch of claim 10, wherein for each of said photorefractive materials, a switch layer is combined with a static interconnection layer, to form an integral layer.

14. The digital electroholographic switch of claim 10, wherein undiffracted light is absorbed by a light block.

15. The digital electroholographic switch of claim 10, wherein undiffracted light is inputted to a detector, for reading address header information of optical data batches traversing the digital electroholographic switch.

16. The digital electroholographic switch of claim 15, wherein said address header information is conveyed to a processing unit for providing a correct control signal for said digital electroholographic switch, to ensure that the data is switched to its intended destination.

17. The digital electroholographic switch of claim 10, wherein said k incoming beams comprise k beams of different angles of incidence.

18. The digital electroholographic switch of claim 10, wherein said k incoming beams comprise k beams of different wavelengths.

19. The digital electroholographic switch of claim 18, wherein at least one adjustable wavelength laser diode is used to produce said k incoming beams of different wavelengths.

20. The digital electroholographic switch of claim 18, wherein at least two adjustable wavelength laser diodes are used to produce said k incoming beams of different wavelengths.

21. The digital electroholographic switch of claim 10, wherein said photorefractive materials are selected from the group consisting of SBN, KTN and KLTN.

22. The digital electroholographic switch of claim 10, wherein said photorefractive material comprise KLTN.

23. The digital electroholographic switch of claim 10, wherein said electric field is applied by means of electrodes, plated on two opposite faces of each of said photorefractive material.

24. The digital electroholographic switch of claim 10, wherein said on/off electroholographic switch has a switching time of less than 100 nsec.

25. The digital electroholographic switch of claim 10, wherein each of said latent holograms, stored in said materials, is activated to become an active hologram in the form of spatial modulation of the refractive index in said photorefractive materials, and further wherein said spatial modulation arises from a quadratic electro-optic effect induced by the combined action of:
- a locally distributed electric field induced by a spatially modulated space charge forming the latent hologram within said paraelectric photorefractive material; and
- an external applied electric field.

26. The digital electroholographic switch of claim 10, wherein each of said latent holograms, stored in said materials, is activated to become an active hologram in the form of spatial modulation of the refractive index in said photorefractive materials, and further wherein said spatial modulation arises from a quadratic electro-optic effect induced by the combined action of:
- a spatially modulated low frequency dielectric constant forming the latent hologram within said paraelectric photorefractive material; and
- an external applied electric field.

27. A large-scale MIN formed as a plurality of digital electroholographic switches of claim 10, arranged, in parallel, as a cross-connection switch.

28. A digital electroholographic switch comprising:
- a first photorefractive material being in a paraelectric phase, in which material, a set of k1 latent holograms is stored, k1 being an integer selected from the group consisting of 2 and integers greater than 2, wherein the activation of said set of k1 latent holograms is controlled by the application of a single, external electric field, and wherein said set of k1 latent holograms is operable to diffract k1 incoming beams, in accordance with a predetermined set of k1 connections;

a second photorefractive material being in a paraelectric phase, in which material, a set of k2 latent holograms is stored, wherein the activation of said set of k2 latent holograms is controlled by the application of said single, external electric field, and wherein said set of k2 latent holograms diffract k2 incoming beams, in accordance with a predetermined set of k2 connections;

a temperature-control device, for maintaining said first and second photorefractive materials at a predetermined, stable temperature of the paraelectric phase; and a power supply, adapted for selectable electrical communication with either one of said first and second photorefractive materials;

wherein said first and second photorefractive materials are disposed so that a light beam traverses them serially, and wherein said single, external electric field may be selectably applied to only one of said first and second photorefractive materials, at any one time, forming said digital electroholographic switch.

29. The digital electroholographic switch of claim 28, and further including at least one additional photorefractive material being in a paraelectric phase, in which material, a set of k3 latent holograms is stored, wherein the activation of said set of k3 latent holograms is controlled by the application of said single, external electric field, and wherein said set of k3 latent holograms is operable to diffract k3 incoming beams, in accordance with a predetermined set of k3 connections, wherein said photorefractive materials are disposed so that a light beam traverses them serially, and wherein said single, external electric field may be selectably applied to only one of said photorefractive materials, at any one time, forming said digital electroholographic switch.

* * * * *